United States Patent
Choi

(10) Patent No.: US 7,407,534 B2
(45) Date of Patent: Aug. 5, 2008

(54) METHOD OF FABRICATING PIPE FOR ABSORBING FUEL EVAPORATION GAS FOR AUTOMOBILES

(75) Inventor: Sung Mu Choi, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 421 days.

(21) Appl. No.: 11/302,086

(22) Filed: Dec. 12, 2005

(65) Prior Publication Data

US 2007/0131115 A1 Jun. 14, 2007

(51) Int. Cl.
*F02M 33/02* (2006.01)
*B01D 53/04* (2006.01)

(52) U.S. Cl. .................. 96/154; 123/518; 427/181; 427/239; 427/444

(58) Field of Classification Search .............. 96/108, 96/154; 95/146; 427/181, 230–239, 372.2–397.8, 427/444; 72/46, 367.1–370.27
See application file for complete search history.

(56) References Cited

U.S. PATENT DOCUMENTS 4,290,789 A * 9/1981 Newton ................ 96/126
5,897,915 A * 4/1999 St. Julien et al. ............ 427/238
6,817,345 B2 * 11/2004 Lawrence .................. 123/518
6,976,477 B2 * 12/2005 Gimby et al. ............... 123/519
6,997,977 B2 * 2/2006 Dallas et al. .................. 96/153
2004/0069146 A1* 4/2004 Carter et al. .................. 96/108
2006/0107835 A1* 5/2006 Heilmann et al. ............. 96/108

FOREIGN PATENT DOCUMENTS

| JP | 54-077291 | 6/1979 |
|----|-----------|--------|
| JP | 59-176414 | 10/1984 |
| JP | 06-248934 | 9/1994 |
| JP | 2002-008940 | 1/2002 |

* cited by examiner

*Primary Examiner*—Frank M Lawrence
(74) *Attorney, Agent, or Firm*—Morgan Lewis & Bockius LLP

(57) ABSTRACT

A pipe for adsorbing fuel evaporation gas in automobiles. An aluminum pipe portion is etched with acid or base so as to increase its surface area and improve its coating properties. The pipe is subjected to a thermal treatment to further improve its coating properties due to creation of an oxidation layer through such etching process, and then is coated at the surface thereof with zeolite slurry with improved adhesion, thereby effectively adsorbing the evaporation gas in terms of performance, endurance and layout.

7 Claims, 3 Drawing Sheets

METHOD OF FABRICATING PIPE FOR ADSORBING FUEL EVAPORATION GAS FOR AUTOMOBILES

BACKGROUND OF THE INVENTION

1. Field of the Invention

The present invention relates to a method of fabricating a pipe for adsorbing fuel evaporation gas for automobiles.

2. Background of the Related Art

Existing exhaust gas regulation is applied to both exhaust gas released from a tail pipe and evaporation gas (e.g. volatile organic compound: VOC) generated from an automobile.

Typically, problems associated with the exhaust gas are addressed by an engine or post-treatment technology, but problems associated with evaporation gas are difficult to cope with and address as they are involved in the entire structure of the automobile.

Such evaporation gas becomes a main source of the formation of optical smog and has ozone for its main ingredient. Evaporation gas regulation is largely divided into non-fuel regulation and fuel regulation.

The non-fuel regulation is designed to regulate evaporation gas released from an automobile besides a fuel supply system, and the fuel regulation is designed to regulate evaporation gas generated from the fuel supply system. Particularly, in case of the fuel regulation of evaporation gas regulation, it is difficult to satisfy a regulation level of the evaporation gas.

For the fuel regulation, almost all of the evaporation gases are generated in such a fashion that when an automobile engine is stopped, evaporation gas is generated from a fuel tank and flows backwards to an intake air supply system from which air is supplied so as to be discharged to the outside of the automobile. That is, the evaporation gas sequentially flows out via the fuel tank, the engine and the intake air supply system. Also, as another discharge path of the evaporation gas, the evaporation gas flows out from the engine to the intake air supply system so as to be discharged to the outside.

Since such evaporation gas occupies more than 50% of fuel evaporation gas from the automobiles, the collection of the evaporation gas flowing out from the intake air supply system is the easiest strategy for complying with the evaporation gas regulation.

FIG. 3 is a graph illustrating comparisons between an intake air supply system and a general exhaust gas regulation system in terms of the amount of hydrogen carbide (HC) emitted from the intake air supply system and the general exhaust gas regulation system according to the size of automobiles. As shown in a graph of FIG. 3, it can be seen that as the size of vehicles increases, the amount of hydrogen carbide (HC) released from the intake air supply system also increases. Thus, it is necessary that hydrogen carbide (HC) released from the intake air supply system should be removed.

Methods of removing the evaporation gas are largely divided into two cases: a first method of basically suppressing the generation of the evaporation gas, and a second method of removing or adsorbing the evaporation gas which has been released from the intake air supply system.

The first method is to basically suppress the evaporation gas to be generated in consideration of the entire system of the automobiles such as a fuel system (connection portion and fuel tank), an engine system, etc. However, it is difficult for the first method to cope with the evaporation gas regulation as the entire system must be taken into consideration in terms of cost and method.

The second method, i.e., a post-treatment method, is to allow the automobile to be equipped with a component for removing or adsorbing the evaporation gas released from the intake air supply system since the amount of the evaporation gas emitted from the intake air supply system also increases as the displacement of the engine increases.

Specifically, the second method is one for appropriately coping with the evaporation gas regulation in which the evaporation gas from the intake air supply system that occupies around 50% of the total emission amount (in case of large vehicles) of the evaporation gas is effectively eliminated or adsorbed so that the release of the evaporation gas from a part of the vehicle can be efficiently suppressed. Thus, a hydrogen carbide (HC) adsorbent is conventionally installed at the intake air supply system side to cope with the evaporation gas regulation.

To this end, there has been proposed various evaporation gas adsorbing methods. As one method among them, activated carbon is installed at the intake air supply system. But such evaporation gas adsorbing method can have problems in that the back pressure of the exhaust gas increases and that the installed activated carbon is apt to be broken due to vibration occurring during operation of the vehicle, which may adversely affect the engine.

As another evaporation gas adsorbing method, the intake air supply system is equipped with an activated carbon sheet fabricated by mixing pulp and activated carbon and compressing the resultant mixture.

Problems involved with the activated carbon sheet include that the back pressure varies depending on its installation method and position, and the activated carbon granules compressed against the surface of the sheet are broken away due to vibration during vehicle operation, which has an adverse influence on the engine. In addition, since the activated carbon sheet is formed in a flat sheet shape, in the case where it is installed inside an air cleaner or a pipe, sheet-securing means is required to support the activated carbon sheet while exerting a certain force thereto.

Furthermore, the back pressure increases at the activated carbon, but the rolled-type sheet with easy installation needs a linear pipe to be mounted inside the intake air supply system and requires a separate structure which is capable of supplying the sheet with a certain force when being installed.

SUMMARY OF THE INVENTION

Embodiments of the present invention provide a method of fabricating a pipe for adsorbing fuel evaporation gas for automobiles. In an exemplary embodiment, an aluminum-based pipe, whose coating properties and back pressure properties are good, is alternatively applied to a plastic pipe portion to be connected to an engine. The aluminum pipe portion is etched with acid or base so as to increase its surface area and improve its coating properties and is subjected to a thermal treatment to further improve its coating properties due to creation of an oxidation layer through such etching process. The aluminum pipe then is coated at a surface thereof with zeolite slurry with improved adhesion, thereby effectively adsorbing the evaporation gas in terms of performance, endurance, cost and layout.

In a further exemplary embodiment of the present invention, a method of fabricating a pipe for adsorbing evaporation gas for automobiles includes producing a portion to be connected to an engine by using aluminum material and processing the connected portion into a pipe shape so as to form an aluminum pipe, etching the surface of the aluminum pipe with a weak acid or weak base solution and drying the etched pipe, subjecting the etched pipe to a heat treatment under an oxidizing atmosphere, mixing colloidal silica, zeolite (Si/Al>500) and water with one another to prepare a mixture in the form of a slurry, and then coating the surface of the heat-treated aluminum pipe with the resultant slurry mixture, and firing and drying the coated aluminum pipe at a temperature of about 300 to 500° C. for two to four hours.

In a further embodiment, the heat treatment step may include exposing the etched pipe under the oxidizing atmosphere at a temperature of about 200 to 400° C. for about a half hour to about one-and-half hours so as to produce aluminum oxide on the surface of the etched pipe.

BRIEF DESCRIPTION OF THE DRAWINGS

Objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
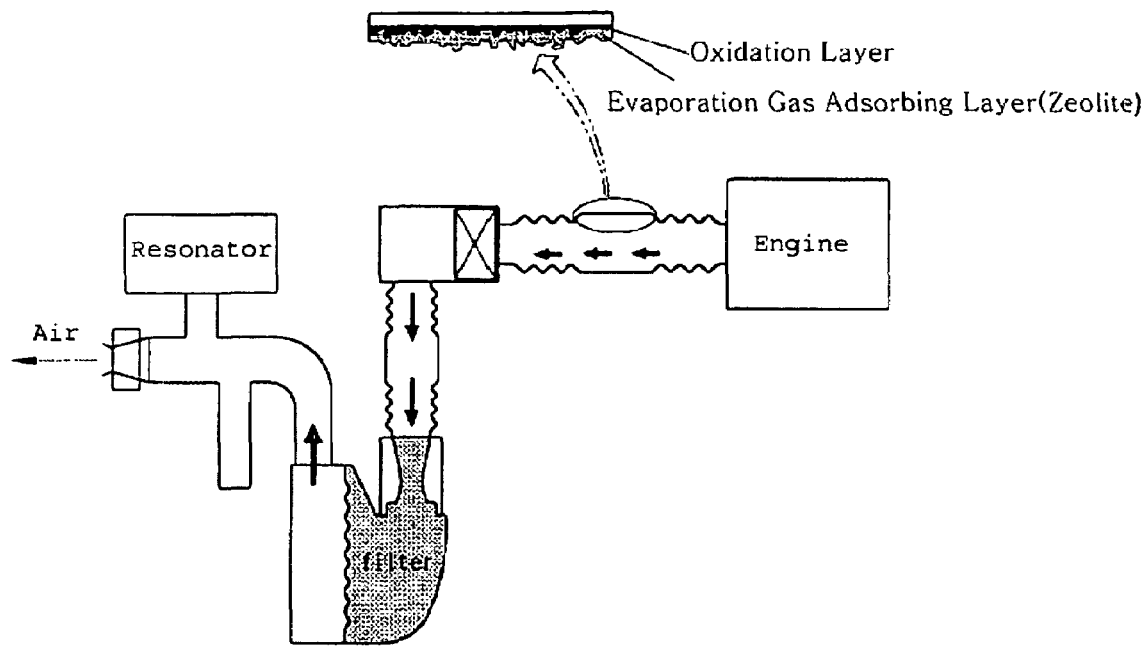
FIG. 1 is a sectional view illustrating a pipe for adsorbing fuel evaporation gas for automobiles according to the present invention.

Reference will now be made in detail to the preferred embodiment of the present invention with reference to the attached drawings.

Embodiments of the present invention are directed to a method of fabricating a pipe for adsorbing fuel evaporation gas for automobiles in which an aluminum-based pipe is alternatively applied to a plastic pipe portion to be connected to an engine, the aluminum pipe portion is etched with acid or base, is subjected to a thermal treatment, and then is coated at the surface thereof with zeolite slurry.

Aluminum pipe has advantages in terms of coating adhesion as compared to other similar pipes (e.g. SUS pipe), zeolite as a coating material is nearly identical to other existing similar evaporation gas adsorbent (activated carbon) in terms of evaporation gas adsorption, but further advantageous in terms of coating properties and endurance. Therefore, the aluminum pipe and the zeolite may be utilized in one exemplary embodiment of the present invention.

In such an exemplary embodiment of the invention, the zeolite may be composed of a porous alumino silicate crystalline structure formed of $SiO_4$ and $AlO_4$ tetrahedrons. Particularly, since silicon ions having the geometric structure such as a regular tetrahedron takes positive charges of +4, they maintains electrical balance together with four oxygen atoms to thereby preserve electrical neutrality.

However, since aluminum ions of +3 are bonded to one another by four oxygen atoms to form a regular tetrahedron, they have a negative charge of −1. Therefore, metal positive ions having charges of +1 or +2 exist around the aluminum tetrahedron so that each aluminum tetrahedron can maintain electrical neutrality to thereby attain its structural stability, and since the metal positive ions have an ion-exchange capacity as an inherent property of the zeolite, they can be easily substituted by appropriate positive ions, if necessary.

Synthesis of zeolite is carried out in such a fashion that an aluminum solution and a silica solution are mixed with each other so as to form a gel mixture, and the gel mixture is subjected to the hydrothermal reaction.

For the structure of the zeolite, there are many kinds. As examples of the structure of the zeolite useful with embodiments of the present invention, MFI, MOR, BEA, etc., can be used. The zeolite is characterized in that the number of oxygen atoms forming the pore entrance thereof is 10 to 12, and the diameter of the pore entrance ranges from 5 to 8 Å. Such structure of the zeolite is very suited for a hydrogen carbide (HC) adsorbent.

In addition, since the MFI, MOR, BEA, etc., are synthesized zeolites, the ratio of Si to Al is relatively freely controlled through the adjustment of the composition of a mixture for synthesis. As the ratio of Si to Al increases, adsorption and adhesion of the evaporation gas also increase.

In an exemplary embodiment of the present invention, the zeolite having the states and properties as mentioned above is mixed with colloidal silica and water, and is subjected to wet-type milling to thereby prepare a mixture in the form of slurry. Subsequently, the aluminum pipe is coated at the surface thereof with the slurry mixture. The colloidal silica used in this exemplary embodiment is acidic, and it is coated on an oxidation layer formed on the alumina surface so that adhesive property can be secured between the colloidal silica and the oxidation layer as well as crack and release of the coating surface of the pipe can be prevented.

An exemplary process of fabricating a pipe for adsorbing evaporation gas for automobiles according to the present invention will be described in detail hereinafter.

First, after a plastic pipe portion to be connected to an engine has been eliminated, an engine-connected portion as a substitute for the plastic pipe portion is produced using aluminum material and processed into a pipe shape so as to form an aluminum pipe.

Second, the surface of the aluminum pipe is etched with a weak acid or base solution to widen the surface area of the pipe, and then is dried.

Third, the etched pipe is exposed under the oxidizing atmosphere at a predetermined temperature (i.e., about 200 to 400° C.) for approximately one-half hour to about one and one-half hours so as to produce aluminum oxide on the surface of the etched pipe. Forming an aluminum oxide layer on the pipe surface is to improve easiness and adhesion of the coating as the coating material is an oxide.

Fourth, colloidal silica, zeolite (Si/Al>500) and water are combined with one another to prepare a mixture in the form of a slurry, and then the surface of the aluminum pipe heat-treated in the above third step is coated with the resulting slurry mixture.

Fifth, the coated aluminum pipe is subjected to firing and drying at a temperature of about 300 to 500° C. for about two to four hours.

Accordingly, in a pipe fabricating process according to the present invention, the aluminum pipe is used for the purpose of improving both coating property and endurance. Further, a water coat (alumina+zeolite) is coated on the surface of the aluminum pipe so that zeolite is securely adhered to the pipe surface, and hence the water coat is not peeled off in spite of strong mechanical or thermal shock. The water coat has been previously fabricated by directly allowing an aluminum structure having a double-layered particle with aluminum and aluminum oxide for a catalystic support to be contained in a solution in which an active catalyst precursor is solved.

Figure 2:
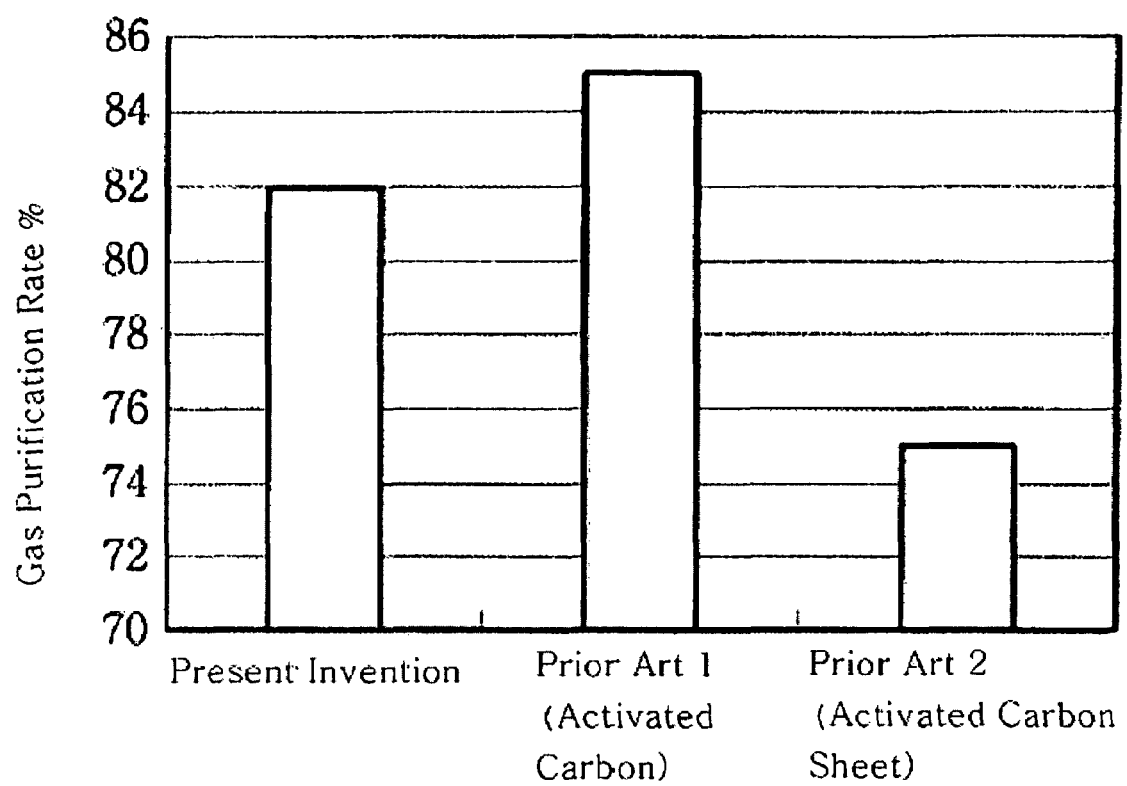
FIG. 2 is a graph illustrating comparisons between the present invention and conventional prior art in terms of a gas purification rate of a pipe for adsorbing fuel evaporation gas for automobiles according to the present invention.
Figure 3:
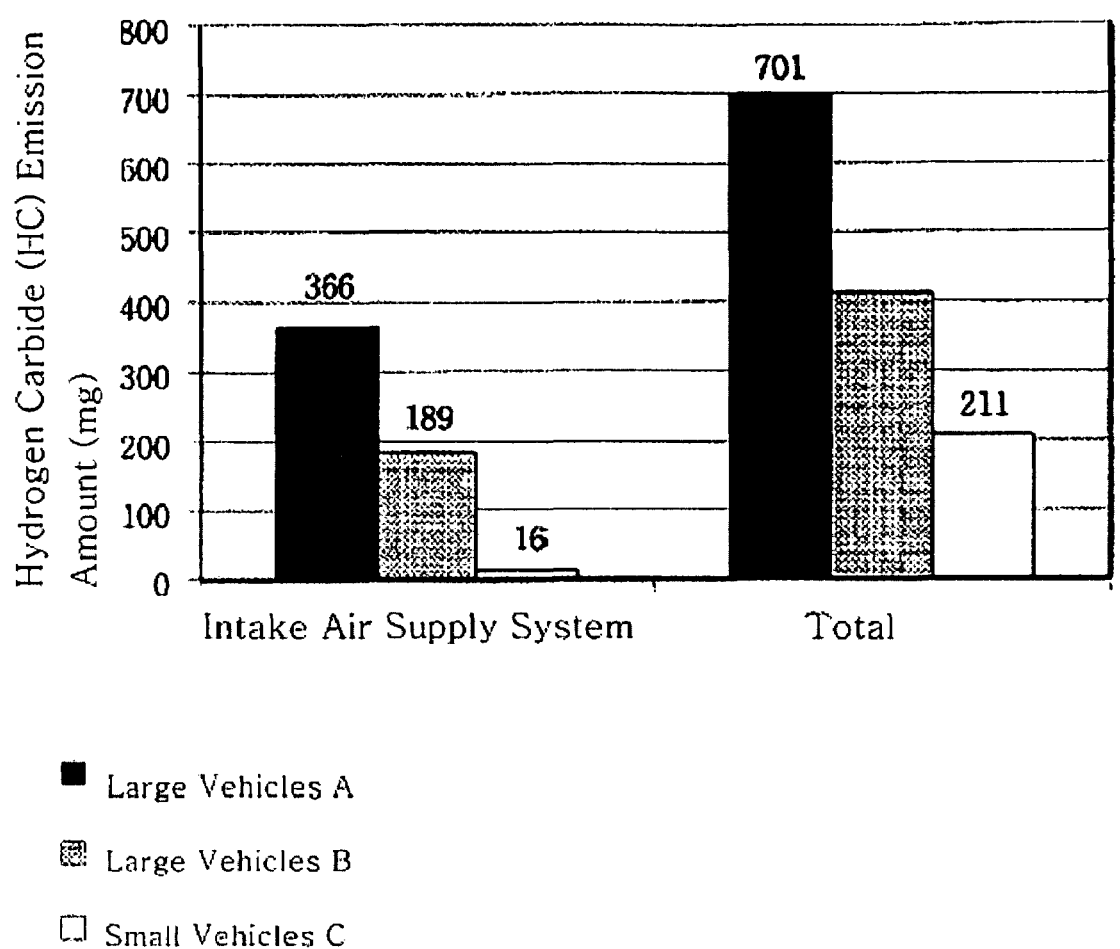
FIG. 3 is a graph illustrating comparisons between an intake air supply system and a general exhaust gas regulation system in terms of the amount of hydrogen carbide (HC) emitted from the intake air supply system and the general exhaust gas regulation system according to the size of automobiles.

Referring to FIG. 2, in the state where 0.3 g of fuel is injected into an engine, there is shown a result of comparing a zeolite-coating scheme in which zeolite is coated on the aluminum pipe according to the present invention, and an activated carbon extruded or activated carbon sheet-installing scheme, in which the activated carbon or activated carbon sheet is installed at the intake air supply system according to the prior art. Respective vertical bar graphs represent gas purification rates.

In this case, considering the fact that the effect of reducing evaporation gas is proportional to the surface area of the pipe portion which is connected to the engine and with which where the evaporation gas comes into contact, since the surface area of the aluminum pipe is relatively small than the installed surface area of the extruded activated carbon, the inventive zeolite-coating scheme has a gas purification rate lower than the activated carbon-installing scheme according to the prior art 1 but higher than the activated carbon sheet-installing scheme. As a result, it is evaluated that the inventive zeolite-coating scheme has a higher specific surface area.

As described above, it is can be seen that the zeolite-coating scheme of the present invention is nearly similar to the prior arts 1 and 2 in terms of a gas purification rate, but is more efficient than the prior arts 1 and 2 in terms of back-pressure, endurance, layout and costs.

As apparent from the foregoing, according to the method of fabricating a pipe for adsorbing evaporation gas for automobiles, an etching layer and oxidation layer are formed on the aluminum pipe which is favorable in terms of coating property and back-pressure property, and then an evaporation gas adsorbent is coated on the formed etching and oxidation layers, so that it is possible to cope with the evaporation gas regulation as well as attain an advantageous effect in terms of performance, endurance, cost and layout.

While embodiments of the present invention have been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of fabricating a pipe for adsorbing evaporation gas for automobiles, comprising:
    etching a surface of an aluminum pipe with a weak acid or weak base solution and drying the etched pipe;
    subjecting the etched pipe to a heat treatment under an oxidizing atmosphere;
    mixing colloidal silica, zeolite (Si/Al>500) and water with one another to prepare a mixture in the form of a slurry, and then coating the surface of the heat-treated aluminum pipe with the resultant slurry mixture; and
    firing and drying the coated aluminum pipe at a temperature of about 300 to 500° C. for about two to four hours.

2. The method set forth in claim 1, wherein the heat treatment comprises exposing the etched pipe under the oxidizing atmosphere at a temperature of about 200 to 400° C. for about one-half hour to about one and one-half hours so as to produce aluminum oxide on the surface of the etched pipe.

3. The method as set forth in claim 1, further comprising providing an aluminum pipe.

4. The method as set forth in claim 3, wherein said providing an aluminum pipe comprises applying aluminum material to a portion to be connected to an engine and machining the pipe portion in a pipe shape.

5. The method as set forth in claim 3, wherein said providing an aluminum pipe comprises producing a portion to be connected to an engine by using aluminum material and processing the connected portion into a pipe shape so as to form an aluminum pipe.

6. An air intake pipe for a vehicle made by a process as set forth in claim 1.

7. The air intake pipe of claim 6, further made by the process set forth in claim 2.

* * * * *